United States Patent [19]

DuRand, III

[11] Patent Number: 4,552,022

[45] Date of Patent: Nov. 12, 1985

[54] SOUND DISCRIMINATOR TESTER

[75] Inventor: Elden E. DuRand, III, Crestwood, Ky.

[73] Assignee: Bluegrass Electronics Inc., La Grange, Ky.

[21] Appl. No.: 376,170

[22] Filed: May 10, 1982

[51] Int. Cl.[4] ............................................ G01H 3/14
[52] U.S. Cl. ...................................... 73/647; 340/566
[58] Field of Search ................. 73/645, 646, 647, 648, 73/658, 1 DV; 340/566, 565, 541

[56] References Cited

U.S. PATENT DOCUMENTS

| | | | |
|---|---|---|---|
| 4,134,109 | 1/1979 | McCormick et al. | 340/566 |
| 4,209,779 | 6/1980 | Beck et al. | 73/658 |
| 4,257,273 | 3/1981 | Knowd | 73/647 |
| 4,307,385 | 12/1981 | Evans et al. | 73/647 |

*Primary Examiner*—Stephen A. Kreitman
*Attorney, Agent, or Firm*—Edward M. Steutermann

[57] ABSTRACT

A device for selecting the proper sensitivity and acceptable background noise level for sound discrimination switches used for detection of selected sounds where the detection device includes peak signal detectors to receive audio voltage generated by the selected sounds and activate an alarm.

1 Claim, 2 Drawing Figures

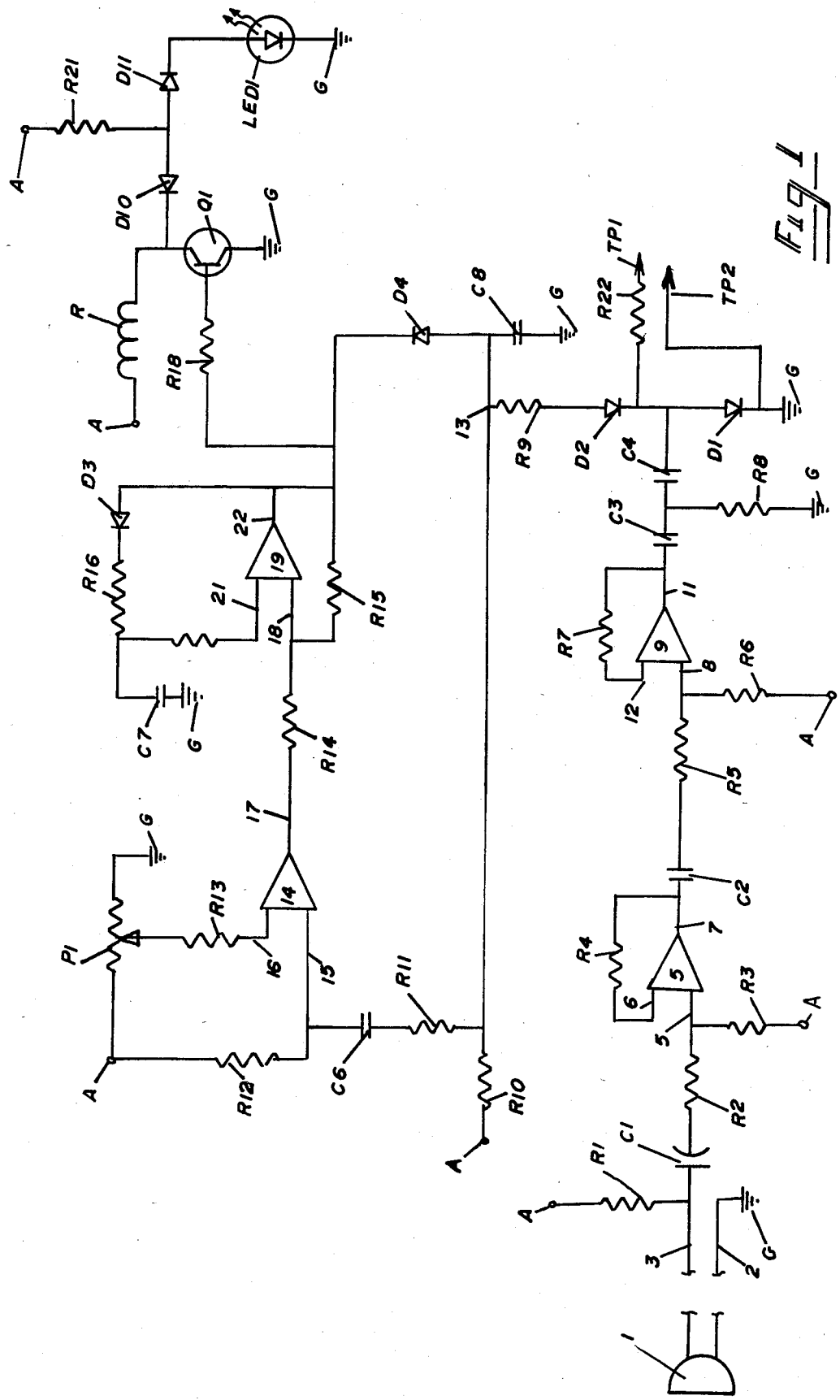

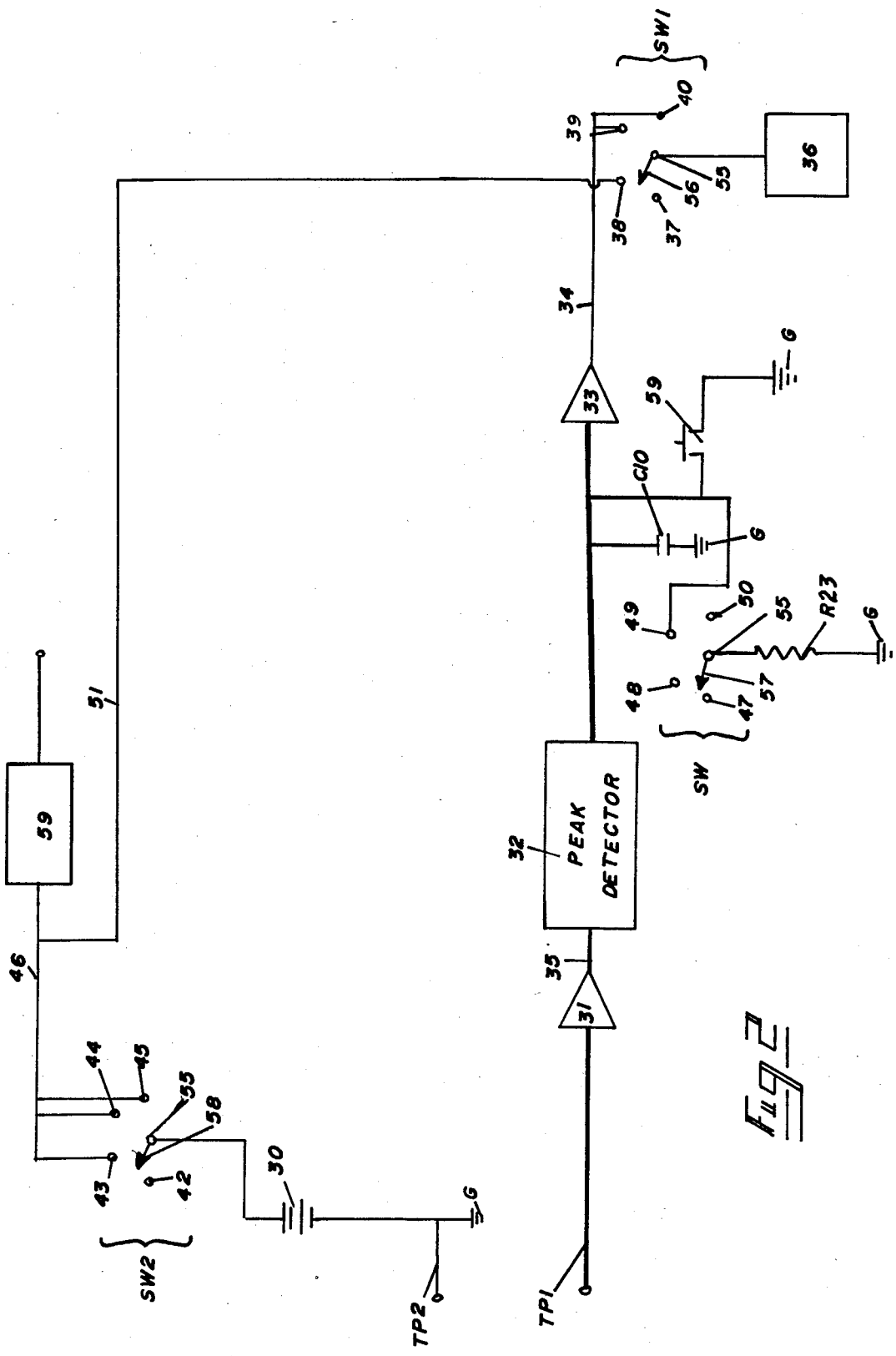

SOUND DISCRIMINATOR TESTER

BACKGROUND OF THE INVENTION

The present invention relates to sound detecting devices commonly utilized for burglar alarms or other types of intrusion alarms where the device is designed to detect, for example the sound of breaking glass, or sounds characteristic of forced entry or other sounds characteristic of a selected incident.

Heretofore the adjustment of such devices, particularly sound discriminating devices, activated by certain selected sounds has been accomplished by trial and error methods where the sensitivity of the unit has been adjusted to actuate on occurence of the selected incident. No test unit is known in the prior art to determine the relationship between the activation level of the sound discrimination detector device and the characteristics of background noise to assist in adjusting the sensitivity of the device.

More particularly, the prior art provides no known method of assessment of the environment in which the detector is located before actual usage so the prior art devices are subject to false tripping by background noise if sensitivity is too high. Likewise if sensitivity is too low the unit does not detect the desired occurance.

Accordingly, it has been found that use of an indicator device in accordance with the present invention provides enhanced selectivity and reliability of an alarm system.

SUMMARY OF THE INVENTION

Devices within the scope of the present invention are inexpensive to manufacture, easy to use, and provide a far more reliable means for set up of sound discriminating systems.

Moreover, utilizing devices within the scope of the present invention the adjustment of sound discriminating switches can be accomplished or background noises diminished to avoid false tripping by a background noise yet maintaining sufficient sensitivity to reliably trip the actuating device upon an actual occurance.

More particularly the present invention provides a device for checking the sensitivity of sound discrimination switches used as sound detection with respect to background noise where the detection device includes peak signal detector means to receive audio voltage generated by sounds to activate an alarm upon receipt of signals of selected frequency.

Various other features in accordance with the present invention will become obvious to those skilled in the art upon reading the disclosure set forth hereinafter.

BRIEF DESCRIPTION OF THE DRAWINGS

One example in accordance with the present invention is illustrated in the accompanying figures wherein:

FIG. 1 is a schematic view of a typical audio switch, for example a Bluegrass Electronics Model AS-5000 audio Switch TM; and FIG. 2 is a schematic diagram of a testing device in accordance with the present invention.

DETAILED DESCRIPTION OF THE DRAWINGS

Referring first to FIG. 1, a sound discrimination device, for example a Bluegrass Electronic Model AS-5000 Audio Switch TM is illustrated for purposes of reference.

As is known in the art sound is converted into a selected audio voltage by means of a microphone 1 having an output supplied through a coupling capacitor C1 in series with a resistor R2 to an input 4 of a noninverting amplifier 5.

A positive supply bias is provided from a voltage source A through a resistor R1 to output 3 before capacitor C1. Voltage source A also provides a positive supply bias through a resistor R3 to input 4 of amplifier 5 as shown where a feedback loop including resistor R4 is provided between input 6 of amplifier 5 and output 7 to set the gain of amplifier 5.

Output 7 of amplifier 5 is supplied through a RC coupling network including capacitor C2, in series with a resistor R5 to an input 8 of a second amplifier 9 where as is in the case of amplifier 5 a feedback loop including resistor R7 is provided between output 11 of amplifier 9 and input 12. A positive supply bias is also provided from source A through resistor R6 to input 8. Output 11 from amplifier 9 is supplied through capacitors C3-C4, with intermediate grounding at ground G through resistor R8. It will be recognized that the frequency response of the amplified voltage signal at output 11 is shaped by the characteristics of capacitor C3-C4 and resistor R8.

Output 12 from capacitor C4 is connected between diodes D1-D2 as shown to the cathode of diode D2 and the anode of diode D1 where the cathode of diode D1 is grounded at G. Diode D2 is in series with resistor R9 to provide an acutating signal at point 13.

Diodes D1-D2 are provided in the arrangement shown to rectify the audio voltage signal which is then filtered by capacitor C8 connected to ground G to provide a filtered and rectified activator signal to a comparator timer circuit as described hereinafter.

A positive bias is provided from source voltage A in series through resistor R10 to provide a pullup for the signal at point 13 which is provided through RC coupling resistor R11 and capacitor C6 to input 15 of a comparator 14, a positive bias is provided from voltage supply A in series with a resistor R12 to input 15.

The reference signal at input 16 of comparator 14 is set by means of a resistor R13 and a potentiometer P1 having an inlet connected to source voltage A and the other connected to ground. It will be understood that the signal applied to input 16 is selectively varied to adjust the sensitivity of the unit to select a characteristic sound which activates the unit. Typically, potentiometer P1 is adjusted to provide the proper sensitivity as discussed hereinafter to actuate an alarm upon receipt of a selected sound but not by background noise. Output 17 from comparator 14 is connected through a resistor R14 to the noninverting input 18 of a level detector 19, an operational amplifier connected as a single ended comparator to provide delay as is known in the art, where the inverting input 21 of op amp 19 is connected to provide delay through a resistor R17 to feedback loop including a diode D3 in series with a resistor R16 to output 22 of comparator 19. Upon alarm output 22 goes low turning off diode D3 which removes the charging potential capacitor C7. Capacitor C7 then discharges through resistor R17 causing input 21 to go low which in turn resets output 22 of op amp 19 to the hi state. In the quiescent state output 22 of comparator 19 is high. Upon alarm output 22 goes low forcing diode D4 into conduction then holding point 13 low which allows comparator C6 to charge through resistor R11. While comparator C6 is charging input 15 is low to hold output 17 in alarm state. Advantageously, capacitor C6 becomes charged before capacitor C7 becomes charged so that output 17 goes high to allow op amp 19 to react upon selective discharge of capacitor C7 and turn off diode D4 allowing capacitor C6 to discharge and force output 17 higher. Positive feedback is provided through resistor R15 from output 22 to input 18.

The collector of transistor Q1 is connected to deactivate a relay R to activate an alarm system upon receipt of a selected signal at input 15 of comparator 14. Diodes D10–D11 and a light emitting diode LED1 are connected in series from the collector of transistor Q1 to ground G where the positive pullup is provided from voltage source A through resistor R21 to a point intermediate diodes D10,D11 so light emitting diode LED a is lit when transistor Q1 is "off".

In the arrangement shown it will be seen when the level detector, comparator/timer assembly 14,19 is actuated transistor Q1 is turned off causing the relay to deenergize and opening the burglar alarm circuit A (not shown) activated by relay R. At the same time the current source/LED 1 is unclamped turning the LED on.

Thus upon receipt of a signal by microphone 1 of the proper frequency the signal is first shaped through amplifiers 5 and 9 and the associated elements and rectifiers D1–D2 to provide a DC signal to input 15 of comparator 14. The signal at input 15 is compared with the preset selected signal at input 16 to determine the resulting condition of output 17. Output 17 is then processed through comparator 19 to provide a selected signal at output 22 which turns off transistor Q1 terminating the current flow through relay R to activate the alarm system. In the absence of a signal of proper configuration transistor Q1 is turned on and the relay R is held in so that the alarm is not activated and light emitting diode LED 1 is "off".

In accordance with one feature of the present invention leads TP1 and TP2 are supplied on opposite sides of diode D1 (as shown) where a resistor R 22 is provided in lead TP1.

An example of a testing device within the scope of the present invention is shown in FIG. 2 in block form and connected at point TP1 in FIG. 1 with a common return path through TP2.

A battery 30 is provided as shown in series with lead TP2 to supply current for portability however, the unit may be line operated with suitable AC power supply and in any event a voltage regulator and filter 59 can be provided to stabilize the supply voltage.

In utilizing the test device the shaped response audio voltage from TP1 is supplied through a high impedance buffer amplifier 31 for isolation from the circuit under test. The output 35 of isolation amplifier 31 is supplied to a peak detector/filter circuit 32, for example, including a full wave rectifier and diode element to maximum voltage at output 49 indicative of the intensity of the signal received at input 35. The signal at output 49 is supplied to meter amplifier 33 to be buffered for transmission to display device 36. Capacitor C10 is provided to selectively hold the output signal.

A four terminal triple deck rotary switch including decks SW1, SW2, SW3, where wiper arms 56, 57, 58 are operated in common by a rotary shaft 55. Deck SW1 includes terminals 37–40, deck SW2 includes terminals 42–45 and deck SW3 includes terminals 47–50. Output 34 from meter amplifier 33 is supplied to terminals 39–40 of deck SW1. Terminal 37 is dead and wiper arm 56 of deck SW1 is connected through lead 41 to a display device which may be either an electromechanical movement or any other type of desired indicator. Deck SW2 is provided with terminals 43,44 and 45 connected to voltage regulator and filter. Terminal 42 is dead and wiper arm 58 is connected to battery 30.

Voltage regulator 59 is provided to stabilize the circuit supply voltage during the life time of battery 30. It is understood the battery operation is for portability only and the unit may be line operated with suitable rectified filtered alternating current power through regulator 59.

Decks SW1, SW2 and SW3 are generally provided in the same unit and operated by shaft 55. Output from deck SW2 is also supplied to terminal 38 of deck SW1 through lead 51 to provide a convenient display of battery condition at display device 36. In deck SW3 terminals 47, 48 and 50 are dead. A reset switch 59 is connected to provide discharge means for tracking filter capacitor C10. Terminal 37 of deck SW1, terminal 42 of deck SW2 and terminal 47 of Deck SW3 are "off" positions. When deck SW2 is in position with terminal 43 activated by wiper arm 58 the display means 36 is connected to the power supply by means of terminal 38 of SW1. The position described is a battery test configuration to determine the condition of the battery by means of the display device if so equipped.

When deck SW2 is positioned with wiper arm 58 contacting terminal 44, deck SW3 is positioned with wiper arm 57 contacting terminal 49 to close the discharge circuit to ground from capacitor C10 but the display device is actuated to display the instantaneous maximum level of the shaped response audio voltage at TP1 in real time. This indicates the response of the tester, that is fast decay of the output peak detector filter capacitor C10.

When wiper arm 58 of deck SW2 is closed on terminal 45, so that wiper arm 57 of deck SW3 is closed on terminal 50 which is a dead pole, and wiper arm 56 of deck SW1 is closed on terminal 40, the display device 36 displays the level of the shaped audio response voltage at TP1 to provide very slow decay of the output detector filter. Reset button 48 is provided to discharge capacitor 10 to reset the display of the tester in preparation for the next test.

In setting up the audio discrimination device a method of simulating the sound of forced entry or other occurance may be used to provide the selected sound. The audio discriminating device as shown in FIG. 1 is installed and connected. The test leads of the tester shown in FIG. 2 are connected to TP1 and TP2 of the audio discriminating device. The battery condition is determined by positioning wiper arm 58 of deck SW2 on terminal 43 so that wiper arm 56 of deck SW1 is positioned on terminal 38 to determine battery condition. Then shaft 55 is positioned so wiper arm 58 of deck SW2 is moved to terminal 44 which moves wiper arm 56 of deck SW1 to terminal 39 and wiper arm 57 of deck SW3 to terminal 49. The simulated sound of a breakin is produced to set the required sensitivity of the audio discriminating device. In this position display device 36 displays the peak signal with a relatively fast decay time.

Finally, wiper arm 58 of deck SW2 is moved to close on terminal 45 so that wiper arm 56 of deck SW1 closes on terminal 40 and wiper arm 57 of deck SW3 closes on terminal 50 which is a dead pole. Normal background noise is simulated and read on display 36. In this position the decay time is greatly increased as the device acts a a peak holding meter to evaluate background noise. By viewing the display device it is determined whether the level of the signal from the background noise is too close to the level of the signal determined by the simulated occurrance. If the two signal levels are close together then the sensitivity of the audio discriminating device can be adjusted by adjustment of potentiometer P1 to insure against false alarms due to background noise. Alternatively the background noise can be reduced.

The invention claimed is:

1. A testing device to adjust operation of a sound detection device having sound transducer means to provide a signal in response to audible occurrence of said first signal and alarm means actuated by said first signal wherein said testing device includes:
    (a) signal peak detector means to receive said first signal;
    (b) display means to indicate the magnitude of said first and second signals and to indicate the magnitude of at least one of said first and second signals; and
    (c) the invention of claim 1 wherein signal extension means are provided to extend the peak valve of the second signal for a selected time period to allow comparison of the first and second signals.

* * * * *